May 19, 1931.  C. J. LANGLEY ET AL  1,805,523
VARIABLE TRANSMISSION
Filed June 27, 1929   5 Sheets-Sheet 2
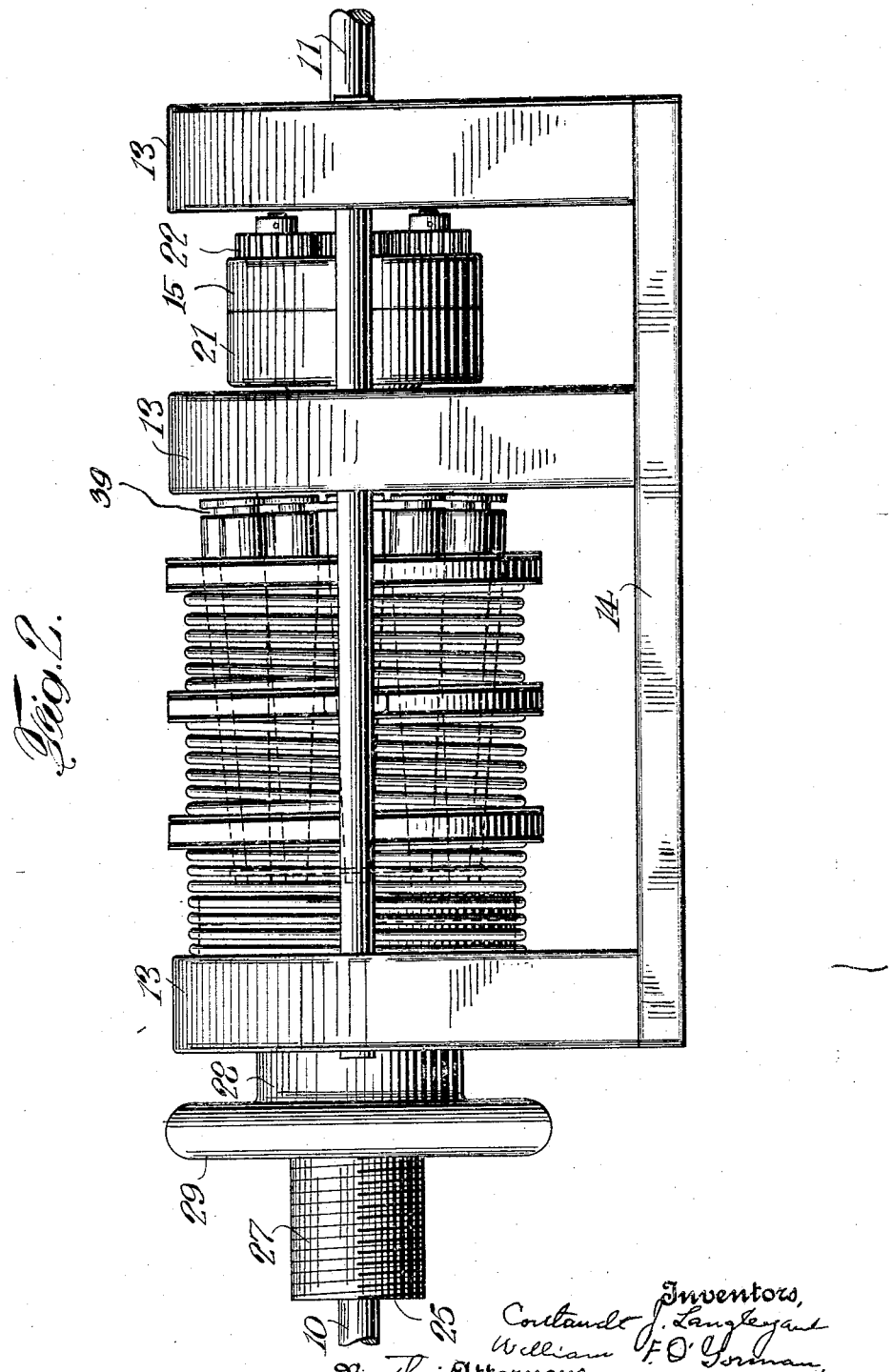

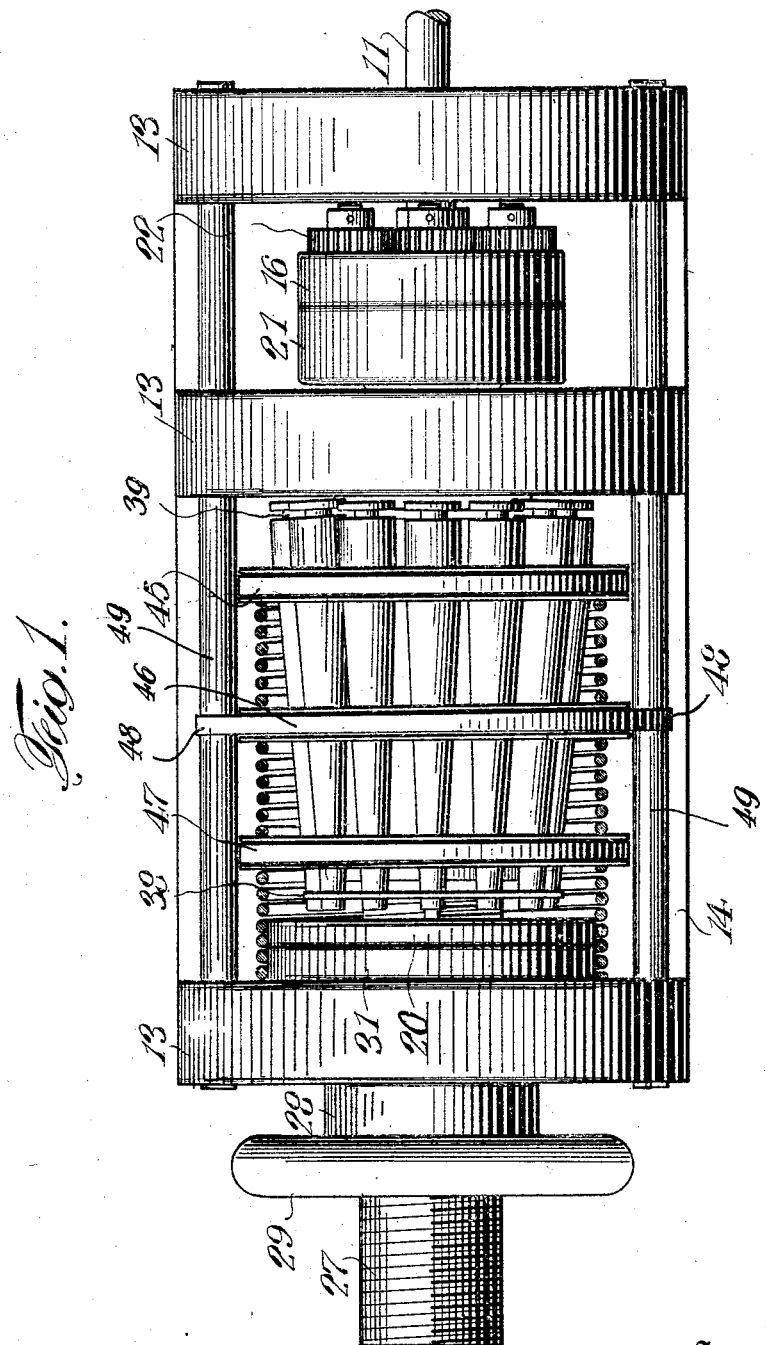

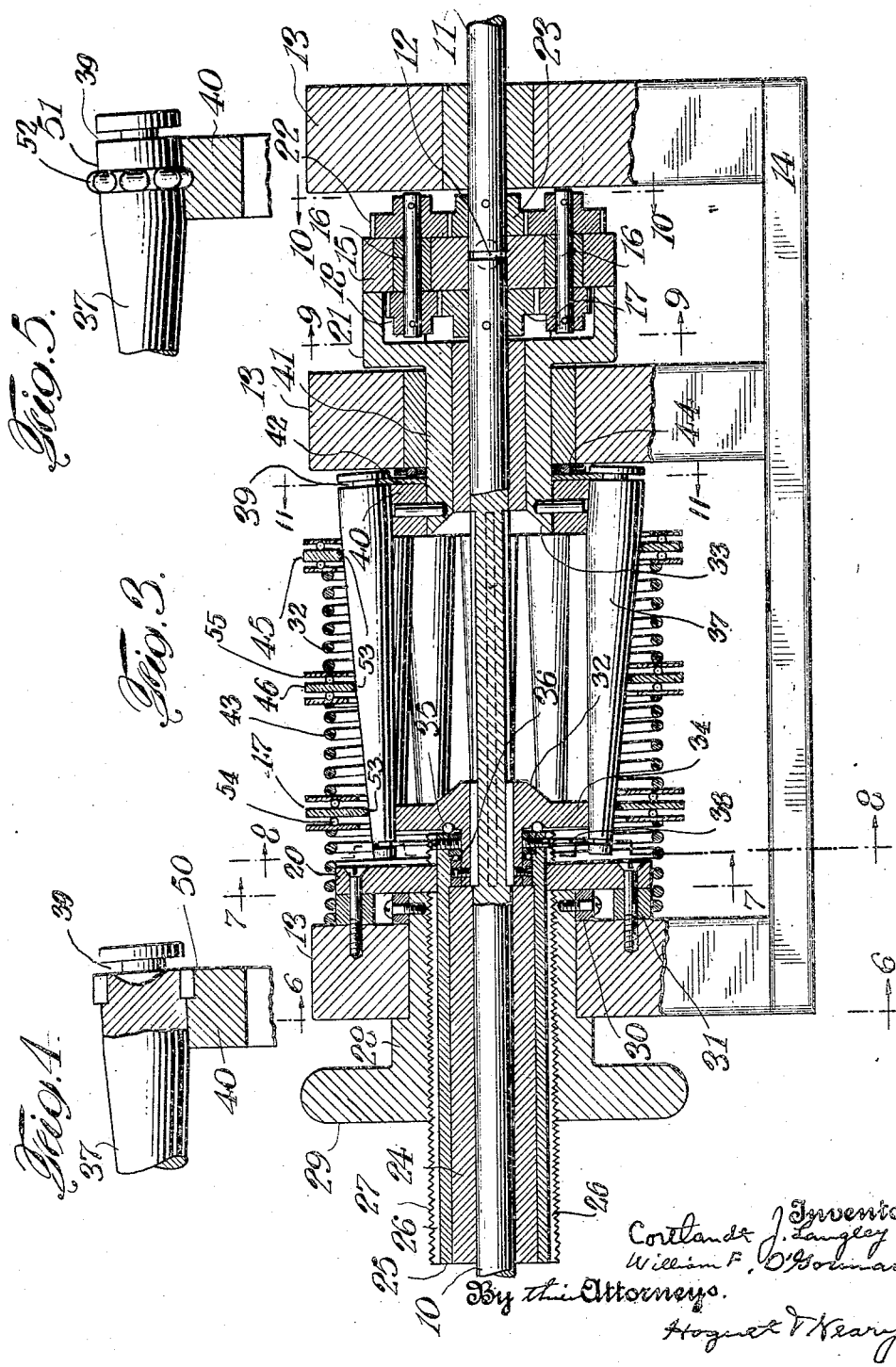

May 19, 1931.  C. J. LANGLEY ET AL  1,805,523
VARIABLE TRANSMISSION
Filed June 27, 1929  5 Sheets-Sheet 4

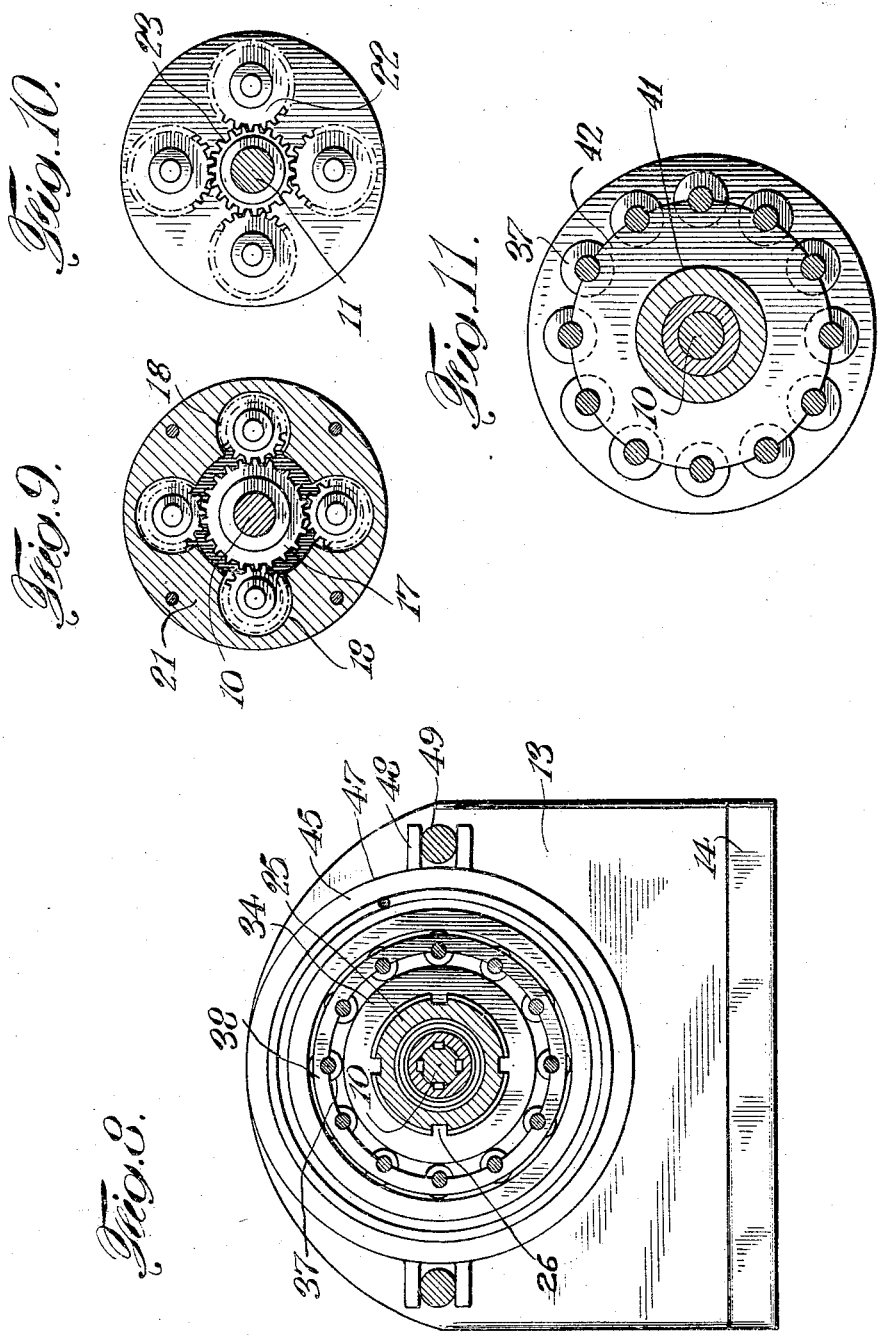

Patented May 19, 1931

1,805,523

UNITED STATES PATENT OFFICE

CORTLANDT J. LANGLEY AND WILLIAM F. O'GORMAN, OF NEW YORK, N. Y., ASSIGNORS TO CHARLES W. BUMSTEAD, OF HIGHLAND PARK, NEW JERSEY, TRUSTEE

VARIABLE TRANSMISSION

Application filed June 27, 1929. Serial No. 373,974.

Our invention relates to improvements in apparatus for transmitting power.

Light high speed engines and motors do not develop their full power until running at a high rate of speed. Thus these motors require clutches and various gear trains to overcome the initial high starting torque of a load. There are many inherent disadvantages to the present types of gear trains and clutches used in this connection.

The primary object of our invention is to produce a means for transmitting power in a driving shaft running at its most efficient speed to a driven shaft which is initially at rest.

Another object of our invention is to produce a form of transmission such that when the driven shaft has been brought up to the speed of the driving shaft, all the parts of the transmission mechanism will move in the same direction and without a further internal movement of the gears.

Other advantages and benefits of our invention will appear from the following description and drawings in which various reference characters refer to similar parts throughout the several drawings.

Fig. 1 is a plan view of a machine showing our improvements;

Fig. 2 is a side elevation thereof;

Fig. 3 is an axial longitudinal section of the machine;

Figs. 4 and 5 are details showing slight alternative connections between certain parts of the apparatus.

Fig. 8 is a cross section on the line 8—8 of Fig. 3;

Fig. 9 is a cross section on the line 9—9 of Fig. 3;

Fig. 10 is a cross section on the line 10—10 of Fig. 3; and

Fig. 11 is a cross section on the line 11—11 of Fig. 3.

Figure 7:
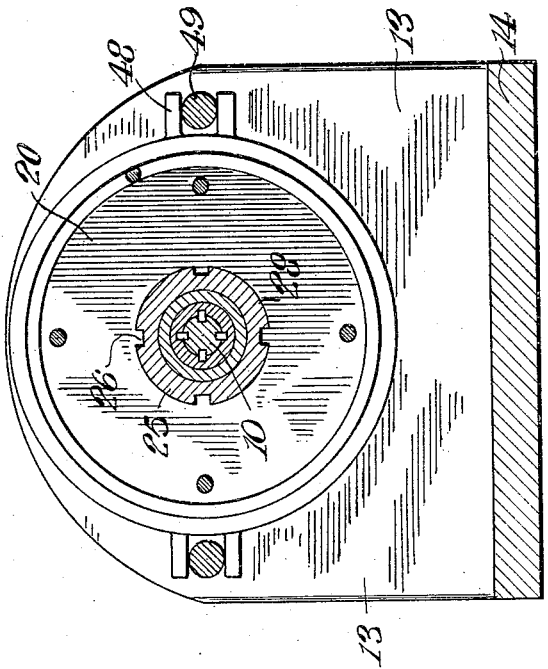
Fig. 7 is a cross section on the line 7—7 of Fig. 3.
Figure 6:
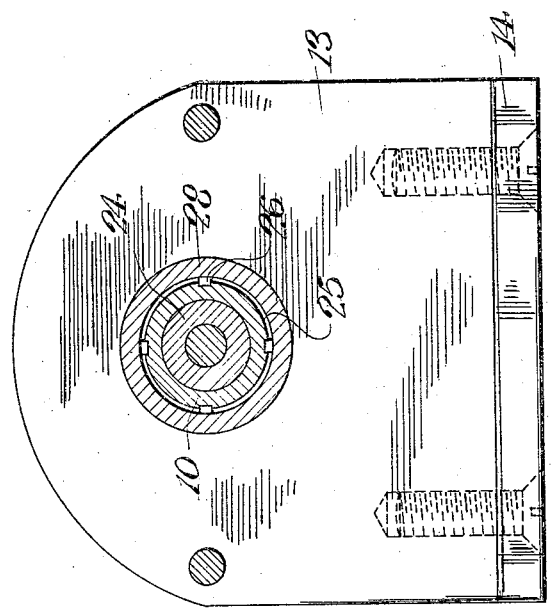
Fig. 6 is a cross section on the line 6—6 of Fig. 3.

The drawings are by way of example, but they show the structure in its preferred form.

The driving shaft 10 is in end alignment with the driven shaft 11 and the two are separated by a suitable thrust bearing such as the ball 12. We have shown the shafts mounted in a suitable supporting frame comprising the standards 13 and the base 14, but it will, of course, be understood that the form of the general apparatus or machine is not material.

The adjacent ends of the driving and driven shafts enter a rotor 15 forming a part of a planetary differential gear connection between the driving and driven shafts and through this extend the parallel shafts 16 of the planetary gears which turn on their own axes and on one side connect by gears 18 and 17 with the driving shaft 10, and on the other by gears 22 and 23 with the driven shaft 11. In the drawings we have shown the gears 18 as having half the number of teeth of the gears 17, and the gears 22 and 23 of equal speeds or teeth, but it will be understood that the gear ratio can be varied as desired. The gears 17 and 18 are enclosed by the housing 21 which is mounted on the driving shaft and is fast to the rotor 15. The apparatus is controlled from the left end as shown in Fig. 3 and at this part the driving shaft has a spacing member 24 on which is the sleeve 25 which has key ways 26 lengthwise thereof and an external screw thread 27. The key ways are to receive the keys on the inner edge of the plate 20, which is fast to one of the bearing members or standards 13 as shown in Fig. 3, being separated therefrom by the spacing rings 30 and 31.

A rotary nut in the form of a sleeve turns on the screw thread 27 and is provided with a suitable wheel 29 so that by turning the nut the sleeve 25 can be moved lengthwise along the shaft 10 for the purpose of regulating the speed of the driven shaft 11 as will presently appear. The movement of the sleeve 25 also moves the control disc 34 and in the drawings we have shown thrust bearings 35 and 36 to reduce friction between the parts mentioned.

The control disc 34 is shown with a cone surface 32 adapted to enter a socket 33 in the housing 21 so that when these parts are in engagement the driving disc and housing will both turn at the same speed and in direct contact. It will be understood that any other suitable form of clutch can be substituted for that shown.

The control disc 34 has its outer surface made to frictionally engage and hold back the several frusto conical members 37 which are grouped around the driving shaft as shown in Fig. 3 and in Figs. 8 and 11. The smaller ends of the tapering driving members 37 are grooved and held against outward displacement by the ring 38 shown in Fig. 8 and the larger ends are grooved as at 39 and are held in the depressions in ring 42 as in Fig. 3 and Fig. 11. The larger end portions of the members 37 are cylindrical and made to nicely fit and rotate on the ring or collar 40 which is fast to the shank 41 of the housing 21. A thrust bearing 44 is shown between the ring 42 and the adjacent stationary parts of the structure.

The tapering members 37 are held against displacement by the bearings 45, 46, and 47. These bearings are held in spaced relationship by the spring 43. They bear against the cones 37 with rounded edges 53. 45 and 47 are left free to turn as can be seen by the arrangement of the ball bearing races 54. Bearing 46 is held in a fixed position by means of the lugs 48 which are held by the guide rods 49 which extend longitudinally at the opposite sides of the machine between the standards 13. The race 55 of collar 46 is left free to turn.

It will be noted by reference to Figure 3 that the tapering members 37 are pitched so that their inner sides will be parallel with the driving shaft 10.

A modification of the connection between the cone members 37 and the ring 40 is shown in Figs. 4 and 5. In Fig. 4 the member 37 is shown as geared at 50 to the ring 40, both members having projecting teeth. In Fig. 5 the cone members have teeth 52 which fit in slots in the collar 40.

Figure 3 shows the transmission means adjusted so that the driving shaft 10 may go at a high rate of speed without transmitting any movement to the driven shaft 11. Assume that the driving shaft 10 travels at a speed of one, the disc 34 which is keyed to shaft 10 will also travel at the speed of one. By means of the gear 17 on shaft 10 movement is transmitted to the gear 18 on the rotor 15. Because of the one-to-two arrangement of the gears the rotor will travel at a speed of two in relation to the speed of the driving shaft 10. No movement will be transmitted to the driven shaft 11 because of the one-to-one ratio of gears 22 and 23. The housing 21 will move at a speed of two inasmuch as it is connected to the rotor 15. The collar 40 connected to the housing 21 will cause the cones 37 to revolve due to the friction connection between the two. As has been stated above, the diameters of the opposite ends of the cones have a two-to-one relationship. It follows that as the cones resting on the collar 40 are caused to revolve at a speed of two, therefore, that portion of the cones resting on the disc 34 also revolves at a speed of two, but due to the two-to-one relationship in diameters, the peripheral speed of the cone bearing on the disc 34 will be the same as that of the disc 34. It is seen, therefore, that there is no braking or accelerating action between the collar 40 or disc 34 and the cones 37. However, by turning the wheel 29, the sleeve 25 may be forced forward, thus moving the key disc 34 along the shaft 10. This movement of the disc 34 changes the relationship of two-to-one between the bearing points on the cones 37. In other words, the cones 37, which are being forced to travel at the speed of two, will no longer, due to their reduction in diameter, have the same peripheral speed as the disc 34, in the position shown in Figure 3. The disc 34 still travels at a speed of one. In moving forward towards the collar 40, the peripheral speed of the cones gradually becomes something greater than that of the disc 34 and gradually approaches the speed of the collar 40. Thus the disc 34 acts as a brake upon the revolving movement of the cones 37. This braking action is transferred by them to the collar 40 and through the sleeve 21 to the rotor 15. Any slowing up of the rotor 15 immediately brings the gears 22 and 23 into action causing a movement in the driven shaft 11. Further movement of the disc 34 towards the collar 40 causes an increase in the braking action upon the rotor 15 with a resulting increase in the speed of shaft 11. As a final position, the disc 34 with its conical surface 32 may be locked into the conical recess 33 of the sleeve 21. In this position, the disc 34 and the sleeve 21 must necessarily travel at the same speed. The disc 34 always travelling at the speed of the driving shaft 10 thus causes the housing 21 of the rotor 15 to also travel at the speed of one. The shaft 11 must then necessarily also travel at the speed of one. It is seen that in this position all of the parts are revolving in the same direction and that there is no movement of the gears 18, 17, 22 or 23.

We have described only a specific form of our device. To those skilled in the art it is obvious that there are possible modifications. We, therefore, do not wish to be limited by this description and drawing but only by the prior art and the appended claims.

What we claim is:

1. A structure of the kind described, comprising a driving shaft and a driven shaft in end alignment, a planetary gear system connecting the shafts and comprising a rotor having gears on opposite sides connected to the appropriate shafts, a housing for one set of gears rotatable on the driving shaft and connected to the rotor, a differential braking connection between the driving shaft and the housing, and a separate clutch connection between the driving shaft and the housing.

2. In a structure such as described the combination with the driving shaft and a group of rotatable tapering members grouped around the shaft, of means for holding the said members against endwise displacement, a driving connection between said tapering members and the driving shaft, a collar embracing the group of tapering members and a resilient member encircling said tapering members for holding said collar in operative position.

3. A structure of the kind described comprising a driving shaft and a driven shaft in end to end relation, a rotor at the adjacent ends of the shafts, planetary gears connecting the rotor with the said shafts, a housing on the driving shaft connected with the said rotor, rotatable tapering members grouped around the driving shaft and having a connection with the said housing, a sliding disc on the shaft engaging the aforesaid tapering members, and a clutch connection between the said disc and the said housing, positioned to act as the said disc reaches the limit of its forward movement on the driving shaft.

In testimony whereof, we have signed our names to this specification.

CORTLANDT J. LANGLEY.
WILLIAM F. O'GORMAN.